United States Patent
Kiwan et al.

(10) Patent No.: US 11,274,623 B1
(45) Date of Patent: Mar. 15, 2022

(54) METHODS AND SYSTEMS FOR FUEL INJECTOR BALANCING

(71) Applicant: Ford Global Technologies, LLC, Dearborn, MI (US)

(72) Inventors: Rani Kiwan, Canton, MI (US); Ross Pursifull, Dearborn, MI (US); Joseph Lyle Thomas, Farmington Hills, MI (US); David Oshinsky, Trenton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/302,498

(22) Filed: May 4, 2021

(51) Int. Cl.
| | | |
|---|---|---|
| F02D 41/30 | (2006.01) | |
| F02D 41/38 | (2006.01) | |
| F02D 41/00 | (2006.01) | |
| F02D 41/36 | (2006.01) | |
| F02B 75/22 | (2006.01) | |
| F02D 41/22 | (2006.01) | |

(52) U.S. Cl.
CPC .......... F02D 41/3064 (2013.01); F02B 75/22 (2013.01); F02D 41/0082 (2013.01); F02D 41/22 (2013.01); F02D 41/36 (2013.01); F02D 41/38 (2013.01); *F02D 2041/224* (2013.01); *F02D 2200/0602* (2013.01)

(58) Field of Classification Search
CPC ...... F02D 41/3064; F02D 41/22; F02D 41/38; F02D 41/36; F02D 41/0082; F02D 2041/224; F02D 2200/0602; F02B 75/22

USPC .............. 123/435, 481, 299, 300, 198 F; 701/103–105, 107, 111

See application file for complete search history.

(56) References Cited

U.S. PATENT DOCUMENTS

| | | |
|---|---|---|
| 7,717,088 B2 | 5/2010 | Thomas |
| 7,806,106 B2 | 10/2010 | Cinpinski et al. |
| 7,841,319 B2 | 11/2010 | Thomas |
| 9,593,637 B2 | 3/2017 | Surilla et al. |
| 10,161,326 B2 * | 12/2018 | Glugla ................ F02D 41/0295 |
| 10,330,035 B2 * | 6/2019 | Martin ................. F02D 41/123 |
| 2010/0089362 A1 | 4/2010 | Haskara et al. |
| 2012/0043393 A1 | 2/2012 | Li et al. |
| 2020/0116099 A1 | 4/2020 | Sumilla et al. |

OTHER PUBLICATIONS

Pursifull, R. et al., "System and Methods for Injecting Fuel to an Engine," U.S. Appl. No. 16/835,654, filed Mar. 31, 2020, 39 pages.
Pursifull, R. et al., "System and Method for Injecting Fuel to an Engine," U.S. Appl. No. 17/017,791, filed Sep. 11, 2020, 33 pages.

(Continued)

*Primary Examiner* — Hai H Huynh
(74) *Attorney, Agent, or Firm* — Geoffrey Brumbaugh; McCoy Russell LLP

(57) ABSTRACT

Methods and systems are provided for balancing a plurality of fuel injectors via a diagnostic. In one example, a method may include adjusting a fuel injection pattern to increase an occurrence of a fuel injection being preceded by a same-cylinder bank fuel injection. The method may further include skipping fuel injections resulting in the fuel injection being preceded by an opposite-cylinder bank fuel injection.

20 Claims, 6 Drawing Sheets

(56) References Cited

OTHER PUBLICATIONS

Pursifull, R. et al., "Method and System for Adjusting Operation of a Fuel Injector," U.S. Appl. No. 17/039,589, filed Sep. 30, 2020, 36 pages.
Kiwan, R. et al., "Method and System for Fuel Injector Balancing," U.S. Appl. No. 17/093,384, filed Nov. 9, 2020, 62 pages.

* cited by examiner

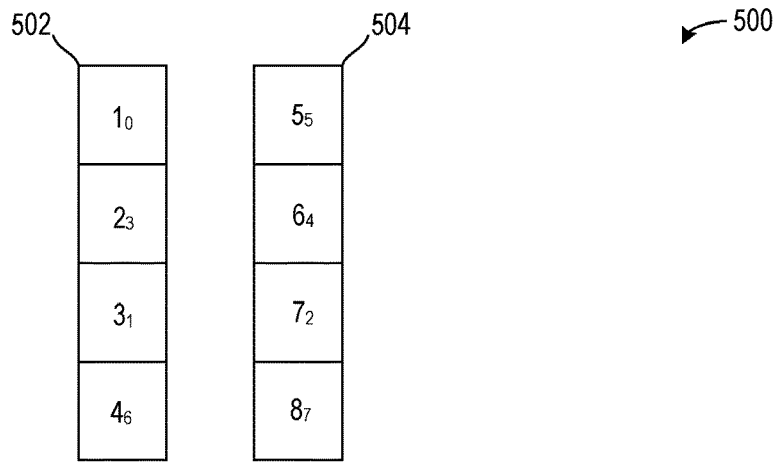
FIG. 5A
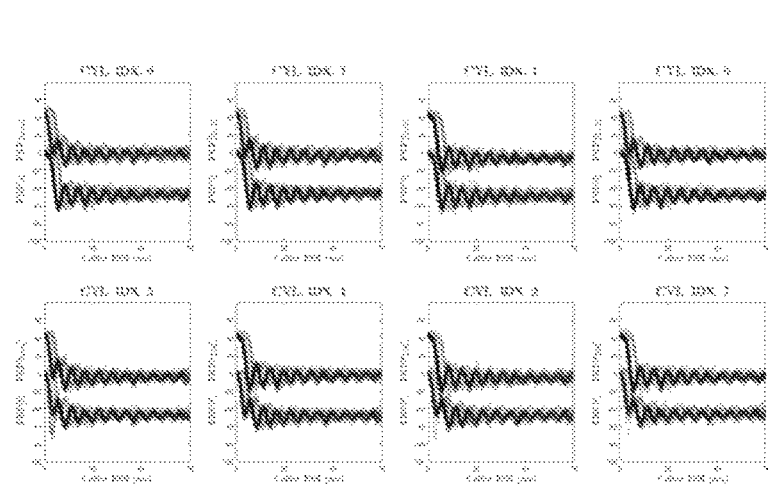
FIG. 5B
|0|- [0-0-0] -|1|- [1-1-1] -|2|- [2-2-2] -|3|- [3-3-3] -|4|- [4-4-4] -|5|- [5-5-5] -|6|- [6-6-6] -|7|- [7-7-7]
FIG. 5C
|0|- [1 – 3 – 6 -0] -|4|- [5 – 7 – 2 -4] -|0|- [1 · 3 – 6- 0] -|4|- [5 – 7 – 2 – 4] ... repeat
FIG. 5D

METHODS AND SYSTEMS FOR FUEL INJECTOR BALANCING

FIELD

The present description relates generally to methods and systems for adjusting a firing order for fuel injector balancing.

BACKGROUND/SUMMARY

Engines may be configured with direct fuel injectors (DI) for injecting fuel directly into an engine cylinder and/or port fuel injectors (PFI) for injecting fuel into an intake port of the engine cylinder. Fuel injectors may develop piece-to-piece variability over time due to imperfect manufacturing processes and/or injector aging, for example. Injector performance may degrade (e.g., injector becomes clogged) which may further increase piece-to-piece injector variability. Additionally or alternatively, injector to injector flow differences may lead to disparate injector aging between injectors. As a result, the actual amount of fuel injected to each cylinder of an engine may not be the desired amount and the difference between the actual and desired amounts may vary between injectors. Variability in a fuel injection amount between cylinders may result in reduced fuel economy, undesired tailpipe emissions, torque variation that causes a lack of perceived engine smoothness, and an overall decrease in engine efficiency. Engines operating with a dual injector system, such as dual fuel or PFDI systems, may have a higher number of fuel injectors resulting in greater possibility for injector variability. It may be desirable to balance the injectors so that all injectors have a similar error (e.g., all injectors at 1% under fueling).

Various approaches use fuel rail pressure drop across each injector to correct each injector's transfer function. One example approach is shown by Surnilla et al. in U.S. 2020/0116099. Therein, fuel rail pressure samples collected during a noisy zone of injector operation are discarded while samples collected during a quiet zone are averaged to determine an injector pressure. The injector pressure is then used to infer injection volume, injector error, and update an injector transfer function. Another example approach is shown by Surnilla et al. in U.S. Pat. No. 9,593,637. Therein, a fuel injection amount for an injector is determined based on a difference in fuel rail pressure (FRP) measured before injector firing and FRP after injector firing.

However, the inventors herein have recognized potential issues with such systems. As one example, average inter-injection pressure is used to estimate the fuel rail pressure drop across each injector even for engines with a higher number of cylinders and corresponding injection events. The inter-injection period may be based on factors such as number of cylinders, engine speed, and injection pulse width. An increase in the number of injectors may result in shorter intervals between two consecutive injection events. Shorter inter-injection periods result in errors in computation of average inter-injection pressure due to Gaussian noises. Another offset error in the estimated average inter-injection pressure may be caused by pressure oscillations due to resonance.

One example approach to solve the above issues for enhanced pressure-based injector balancing (PBIB) is to skip injections or to unevenly space injections to increase an inter-injection period. By increasing the inter-injection period, PBIB may be used for the fired injectors. However, the inventors have also found short-comings with this approach. As one example, errors due to resonant pressure oscillations is repeatable and may increase when switching injections from a first bank to a second bank. By adjusting an injection pattern to only skip a subsequent injection, resonance pressures may still affect PBIB measurements and may inhibit desired injector balancing. Additionally, such a routine may need multiple engine cycles to perform one or more injections via each injector for PBIB measurement. This may take an extended period of time, which may not be possible during a plurality of driving conditions.

In one example, the issues described above may be addressed by a method for adjusting a fuel injection pattern during a fuel injector diagnostic to inject fuel from only a plurality of first injectors of a first bank while skipping fuel injections from a plurality of second injectors of a second bank. In this way, a sensed FRP may be more accurate, which may enhance the fuel injector diagnostic.

As one example, the method further includes adjusting a fuel injection pattern to increase an occurrence of fuel injections being preceded by same-cylinder bank fuel injections. When the inter-injection average (before and after the injection) is computed following injections on the same cylinder bank, the phasing of the predominant pressure wave is similar and significant error in computing the pressure drop is avoided. Fuel injections of an opposite cylinder bank may be skipped such that only injectors of a single cylinder bank are injecting. Each of the cylinders may be equipped with port-fuel injectors and direct injectors. When direct injections are skipped during the fuel injector diagnostic, the port-fuel injections may be commanded to inject the fuel not injected by a skipped DI injection to maintain a desired air/fuel ratio. By doing this, the fuel injection diagnostic may accrue more accurate data more quickly relative to other examples of diagnostics described above.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 5A shows an engine with two cylinder banks and indexed cylinder numbers based on a normal injection pattern.

FIG. 5B shows a resonance pressure effect on a fuel rail pressure for a fuel injection preceded by a fuel injection of a different or a same cylinder bank.

FIG. 5C shows a first example of an adjusted fuel injection pattern for increasing an occurrence of an injection being preceded by a same-cylinder bank injection for a single injector.

FIG. 5D shows a second example of an adjusted fuel injection pattern for increasing an occurrence of an injection being preceded by a same-cylinder bank injection for a plurality of injectors of a cylinder bank.

DETAILED DESCRIPTION

Figure 1:
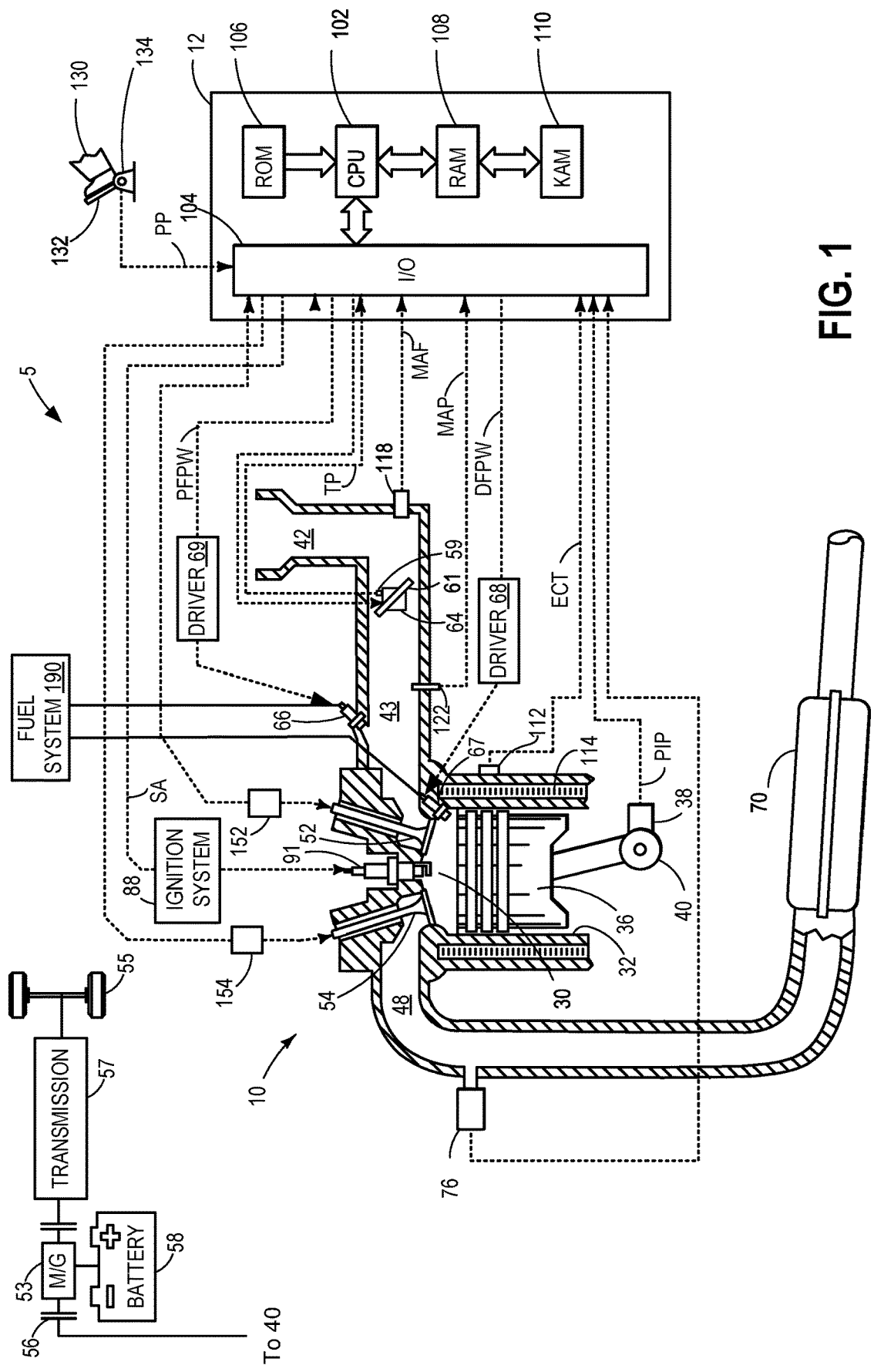
FIG. 1 shows a schematic depiction of an example propulsion system including an engine.
Figure 2:
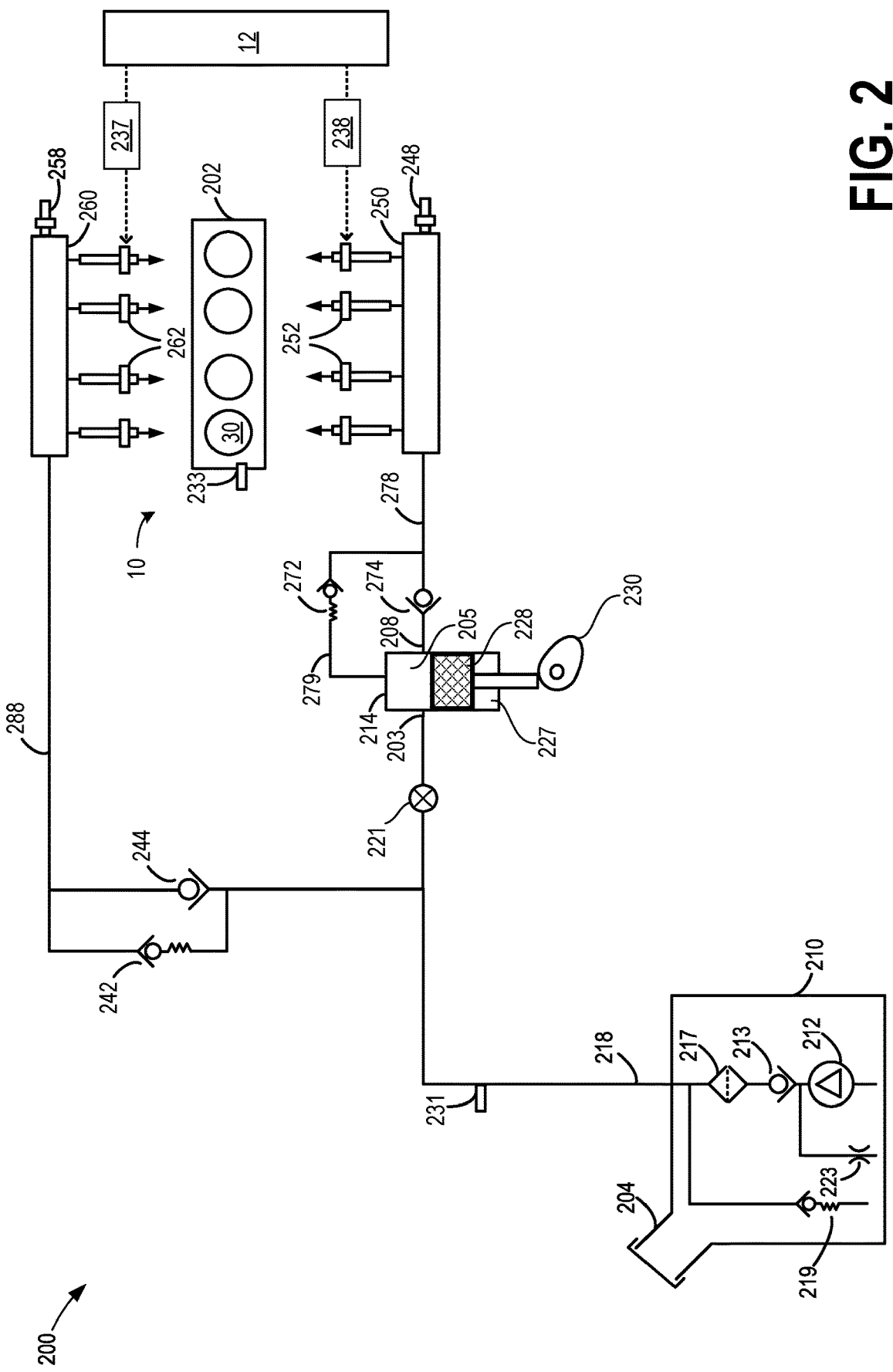
FIG. 2 shows an example fuel system coupled to the engine of FIG. 1.

The following description relates to systems and methods for balancing fuel injectors errors via a pressure-based injector balancing diagnostic. The diagnostic may be executed on one or more of port-fuel injectors and direct injectors. In one example, the diagnostic is executed on only direct injectors. An engine may include a cylinder configured to receive fuel from each of a port-fuel injector and a direct injector, as shown in FIG. 1. The cylinder may be one of a plurality of cylinders of multiple banks of the engine. FIG. 2 shows a single cylinder bank of an engine including multiple cylinder banks along with a fuel system for fueling fuel rails of the port-fuel injectors and the direct injectors.

Figure 3:
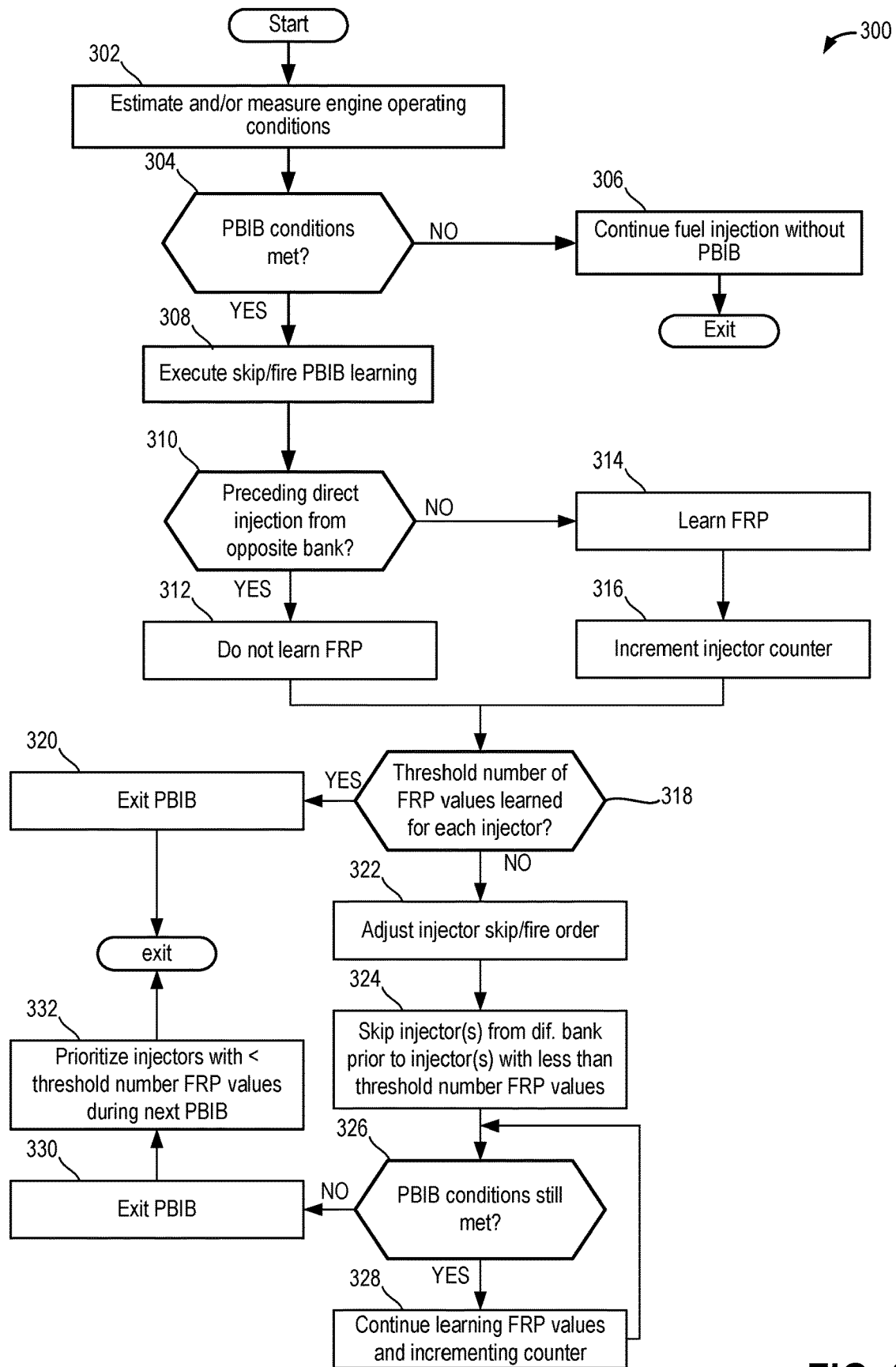
FIG. 3 shows a method for adjusting a fuel injection pattern during a fuel injector diagnostic.
Figure 4:
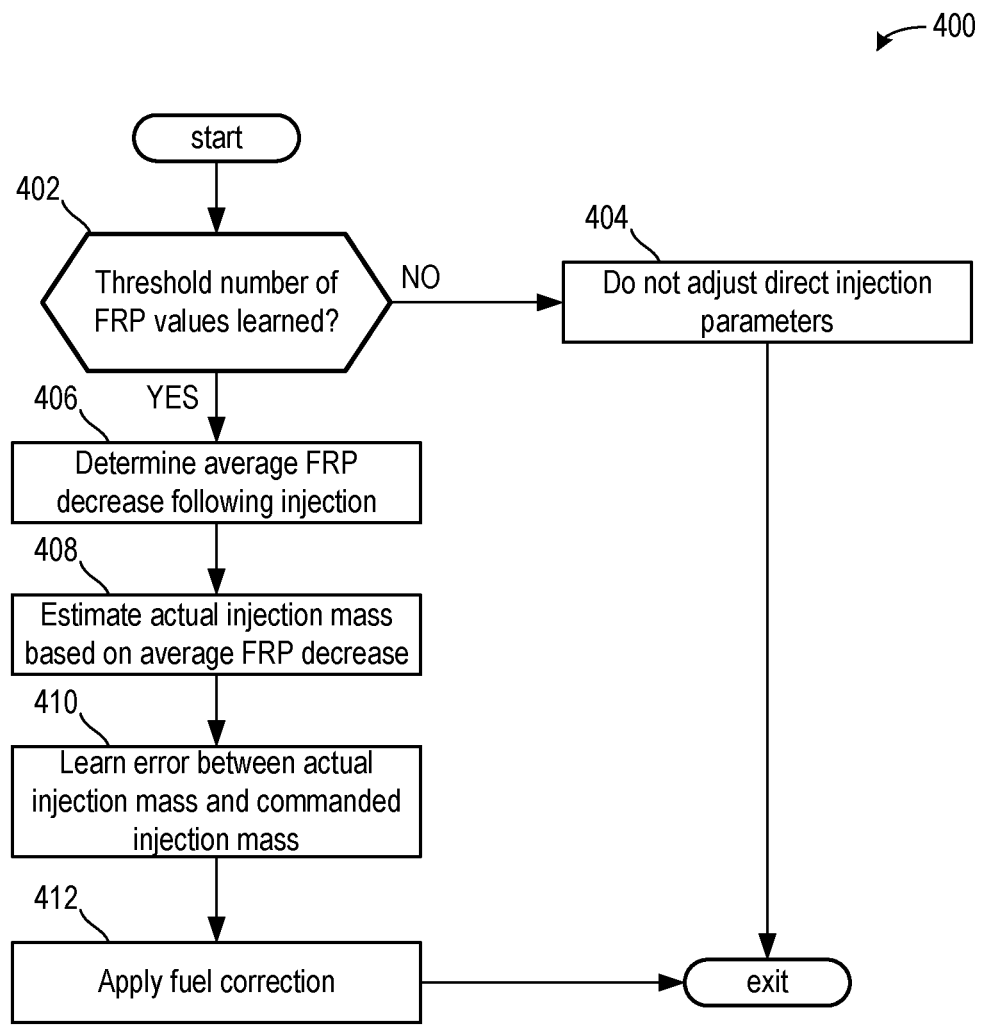
FIG. 4 shows a method for adjusting fuel injection parameters based on data acquired during the method of FIG. 3.
Figure 6:
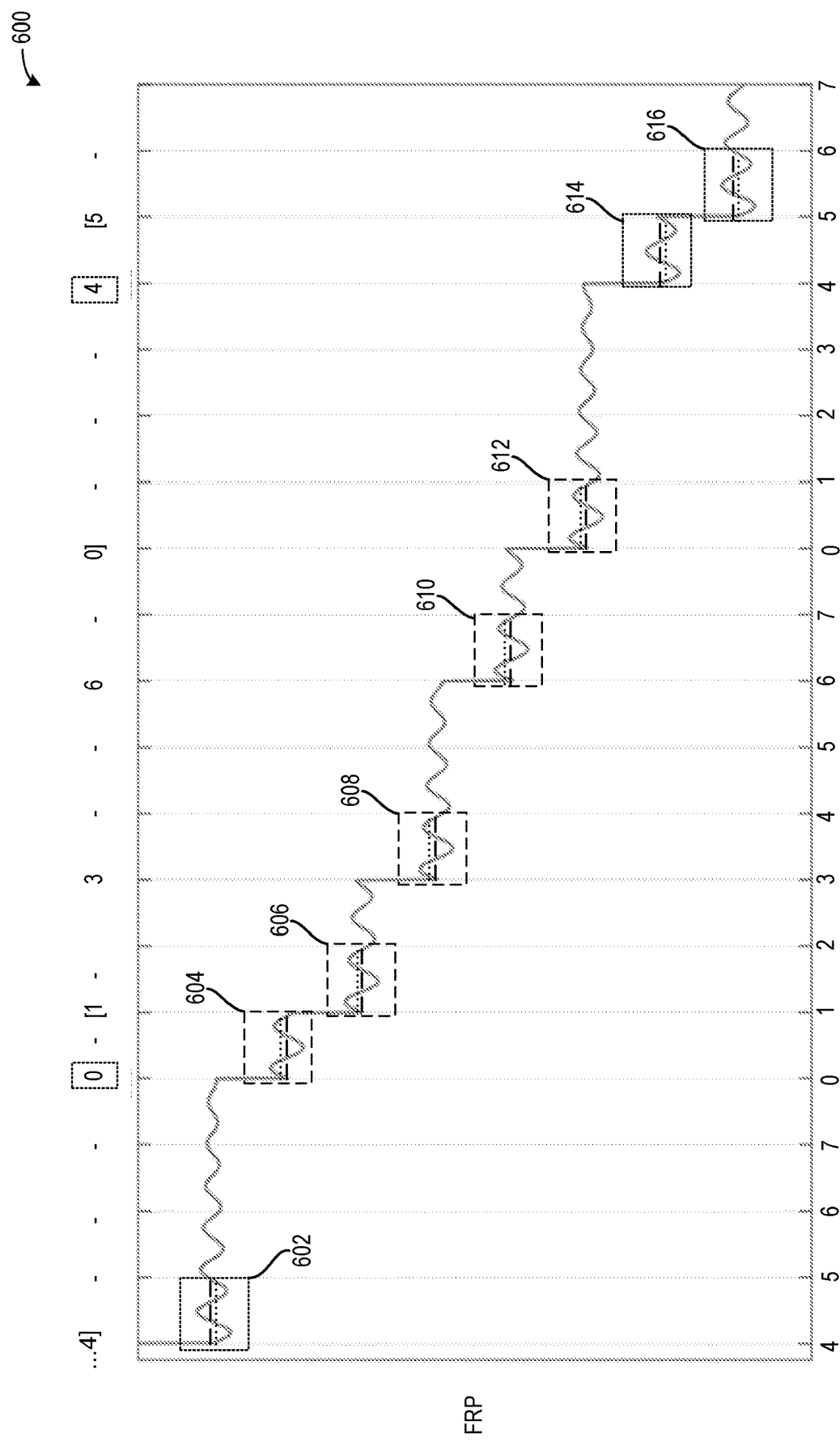
FIG. 6 shows a graph illustrating FRPs for injections preceded by same-cylinder bank injections.

A method for adjusting an injection pattern of one of the direct injectors or the port-fuel injectors during the PBIB diagnostic is shown in FIG. 3. A method for adjusting fueling parameters of one or more fuel injectors based on data accrued during the method of FIG. 3 is shown in FIG. 4. An example traditional injection pattern for injectors of separate cylinder banks is shown in FIG. 5A. Herein, the traditional injection pattern corresponds to an injection pattern of the fuel injectors outside of the PBIB diagnostic. FIG. 5B illustrates a pressure resonance effect on an interinjection period of a fuel injection preceded by either a same cylinder injection or an opposite cylinder bank injection. FIGS. 5C and 5D illustrate different injection patterns for promoting fuel injections to be preceded by a same cylinder bank fuel injection to acquire FRP values for a desired cylinder or cylinder bank. FIG. 6 shows a graphical illustration of FRPs generated via the injection pattern of FIG. 5D.

FIG. 1 shows a schematic depiction of a spark ignition internal combustion engine 10 with a dual injector system, where engine 10 is configured with both direct injection and port fuel injection. As such, engine 10 may be referred to as a port-fuel direct inject (PFDI) engine. Engine 10 may be included in a vehicle 5. Engine 10 comprises a plurality of cylinders of which one cylinder 30 (also known as combustion chamber 30) is shown in FIG. 1. Cylinder 30 of engine 10 is shown including combustion chamber walls 32 with piston 36 positioned therein and connected to crankshaft 40. A starter motor (not shown) may be coupled to crankshaft 40 via a flywheel (not shown), or alternatively, direct engine starting may be used.

Combustion chamber 30 is shown communicating with intake manifold 43 and exhaust manifold 48 via intake valve 52 and exhaust valve 54, respectively. In addition, intake manifold 43 is shown with throttle 64 which adjusts a position of throttle plate 61 to control airflow from intake passage 42.

Intake valve 52 may be operated by controller 12 via actuator 152. Similarly, exhaust valve 54 may be activated by controller 12 via actuator 154. During some conditions, controller 12 may vary the signals provided to actuators 152 and 154 to control the opening and closing of the respective intake and exhaust valves. The position of intake valve 52 and exhaust valve 54 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 30 may alternatively include an intake valve controlled via electric valve actuation and an exhaust valve controlled via cam actuation including CPS and/or VCT. In other embodiments, the intake and exhaust valves may be controlled by a common valve actuator or actuation system, or a variable valve timing actuator or actuation system.

In another embodiment, four valves per cylinder may be used. In still another example, two intake valves and one exhaust valve per cylinder may be used.

Combustion chamber 30 can have a compression ratio, which is the ratio of volumes when piston 36 is at bottom center to top center. In one example, the compression ratio may be approximately 9:1. However, in some examples where different fuels are used, the compression ratio may be increased. For example, it may be between 10:1 and 11:1 or 11:1 and 12:1, or greater.

In some embodiments, each cylinder of engine 10 may be configured with one or more fuel injectors for providing fuel thereto. As shown in FIG. 1, cylinder 30 includes two fuel injectors, 66 and 67. Fuel injector 67 is shown directly coupled to combustion chamber 30 and positioned to directly inject therein in proportion to the pulse width of signal DFPW received from controller 12 via electronic driver 68. In this manner, direct fuel injector 67 provides what is known as direct injection (hereafter referred to as "DI") of fuel into combustion chamber 30. While FIG. 1 shows injector 67 as a side injector, it may also be located overhead of the piston, such as near the position of spark plug 91. Such a position may improve mixing and combustion due to the lower volatility of some alcohol based fuels. Alternatively, the injector may be located overhead and near the intake valve to improve mixing.

Fuel injector 66 is shown arranged in intake manifold 43 in a configuration that provides what is known as port injection of fuel (hereafter referred to as "PFI") into the intake port upstream of cylinder 30 rather than directly into cylinder 30. Port fuel injector 66 delivers injected fuel in proportion to the pulse width of signal PFPW received from controller 12 via electronic driver 69.

Fuel may be delivered to fuel injectors 66 and 67 by a high pressure fuel system 190 including a fuel tank, fuel pumps, and fuel rails. Further, the fuel tank and rails may each have a pressure transducer providing a signal to controller 12. In this example, both direct fuel injector 67 and port fuel injector 66 are shown. However, certain engines may include only one kind of fuel injector such as either direct fuel injector or port fuel injector. Fuel injection to each cylinder may be carried out via direct injectors (in absence of port injectors) or port direct injectors (in absence of direct injectors). An example fuel system including fuel pumps and injectors and fuel rails is elaborated on with reference to FIG. 2.

Returning to FIG. 1, exhaust gases flow through exhaust manifold 48 into emission control device 70 which can include multiple catalyst bricks, in one example. In another example, multiple emission control devices, each with multiple bricks, can be used. Emission control device 70 can be a three-way type catalyst in one example.

Exhaust gas sensor 76 is shown coupled to exhaust manifold 48 upstream of emission control device 70 (where sensor 76 can correspond to a variety of different sensors). For example, sensor 76 may be any of many known sensors for providing an indication of exhaust gas air/fuel ratio such as a linear oxygen sensor, a UEGO, a two-state oxygen sensor, an EGO, a HEGO, or an HC or CO sensor. In this particular example, sensor 76 is a two-state oxygen sensor that provides signal EGO to controller 12 which converts signal EGO into two-state signal EGOS. A high voltage state of signal EGOS indicates exhaust gases are rich of stoichiometry and a low voltage state of signal EGOS indicates exhaust gases are lean of stoichiometry. Signal EGOS may be used to advantage during feedback air/fuel control to maintain average air/fuel at stoichiometry during a stoichiometric homogeneous mode of operation. A single exhaust gas sensor may serve 1, 2, 3, 4, 5, or other number of cylinders.

Distributorless ignition system 88 provides ignition spark to combustion chamber 30 via spark plug 91 in response to spark advance signal SA from controller 12.

Controller 12 may cause combustion chamber 30 to operate in a variety of combustion modes, including a homogeneous air/fuel mode and a stratified air/fuel mode by controlling injection timing, injection amounts, spray patterns, etc. Further, combined stratified and homogenous mixtures may be formed in the chamber. In one example, stratified layers may be formed by operating injector 66 during a compression stroke. In another example, a homogenous mixture may be formed by operating one or both of injectors 66 and 67 during an intake stroke (which may be open valve injection). In yet another example, a homogenous mixture may be formed by operating one or both of injectors 66 and 67 before an intake stroke (which may be closed valve injection). In still other examples, multiple injections from one or both of injectors 66 and 67 may be used during one or more strokes (e.g., intake, compression, exhaust, etc.). Even further examples may be where different injection timings and mixture formations are used under different conditions, as described below.

Controller 12 can control the amount of fuel delivered by fuel injectors 66 and 67 so that the homogeneous, stratified, or combined homogenous/stratified air/fuel mixture in chamber 30 can be selected to be at stoichiometry, a value rich of stoichiometry, or a value lean of stoichiometry. Further, controller 12 may be configured to adjust a fuel injection pattern of the fuel injectors 66 and 67 during a pressure-based injector balancing (PBIB) diagnostic. The controller 12 may include instructions that when executed cause the controller 12 to adjust an injection pattern to increase an occurrence of an injection being preceded by a same cylinder bank injection. Thus, the cylinder 30 may be one cylinder of a first cylinder bank, the engine 10 further comprising a second cylinder bank as illustrated in FIG. 5A. The controller 12 may be further configured to monitor a fuel rail pressure (FRP) of an inter-injection period during the PBIB diagnostic. In one example, the controller 12 may be configured to learn only FRPs of inter-injection periods for injections preceded by a same-cylinder bank injection while ignoring FRPs for injections preceded by an opposite-cylinder bank injection. Additionally or alternatively, the controller 12 may signal to skip injections from the opposite-cylinder bank, thereby increasing the occurrence of injections being preceded by a same-cylinder bank injection, which may increase a rate in which FRP data is accrued.

As described above, FIG. 1 merely shows one cylinder of a multi-cylinder engine, and that each cylinder has its own set of intake/exhaust valves, fuel injectors, spark plugs, etc. Also, in the example embodiments described herein, the engine may be coupled to a starter motor (not shown) for starting the engine. The starter motor may be powered when the driver turns a key in the ignition switch on the steering column, for example. The starter is disengaged after engine start, for example, by engine 10 reaching a predetermined speed after a predetermined time. Further, in the disclosed embodiments, an exhaust gas recirculation (EGR) system may be used to route a desired portion of exhaust gas from exhaust manifold 48 to intake manifold 43 via an EGR valve (not shown). Alternatively, a portion of combustion gases may be retained in the combustion chambers by controlling exhaust valve timing.

In some examples, vehicle 5 may be a hybrid vehicle with multiple sources of torque available to one or more vehicle wheels 55. In other examples, vehicle 5 is a conventional vehicle with only an engine, or an electric vehicle with only electric machine(s). In the example shown, vehicle 5 includes engine 10 and an electric machine 53. Electric machine 53 may be a motor or a motor/generator. Crankshaft 40 of engine 10 and electric machine 53 are connected via a transmission 57 to vehicle wheels 55 when one or more clutches 56 are engaged. In the depicted example, a first clutch 56 is provided between crankshaft 40 and electric machine 53, and a second clutch 56 is provided between electric machine 53 and transmission 57. Controller 12 may send a signal to an actuator of each clutch 56 to engage or disengage the clutch, so as to connect or disconnect crankshaft 40 from electric machine 53 and the components connected thereto, and/or connect or disconnect electric machine 53 from transmission 57 and the components connected thereto. Transmission 57 may be a gearbox, a planetary gear system, or another type of transmission. The powertrain may be configured in various manners including as a parallel, a series, or a series-parallel hybrid vehicle.

Electric machine 53 receives electrical power from a traction battery 58 to provide torque to vehicle wheels 55. Electric machine 53 may also be operated as a generator to provide electrical power to charge battery 58, for example during a braking operation.

Controller 12 is shown in FIG. 1 as a conventional microcomputer including: central processing unit (CPU) 102, input/output (I/O) ports 104, read-only memory (ROM) 106, random access memory (RAM) 108, keep alive memory (KAM) 110, and a conventional data bus. Controller 12 is shown receiving various signals from sensors coupled to engine 10, in addition to those signals previously discussed, including measurement of inducted mass air flow (MAF) from mass air flow sensor 118; engine coolant temperature (ECT) from temperature sensor 112 coupled to cooling sleeve 114; a profile ignition pickup signal (PIP) from Hall effect sensor 38 coupled to crankshaft 40; and throttle position TP from throttle position sensor 59 and an absolute Manifold Pressure Signal MAP from sensor 122. Engine speed signal RPM is generated by controller 12 from signal PIP in a conventional manner and manifold pressure signal MAP from a manifold pressure sensor provides an indication of vacuum, or pressure, in the intake manifold. During stoichiometric operation, this sensor can give an indication of engine load. Further, this sensor, along with engine speed, can provide an estimate of charge (including air) inducted into the cylinder. In one example, sensor 38, which is also used as an engine speed sensor, produces a predetermined number of equally spaced pulses every revolution of the crankshaft. The controller 12 receives signals from the various sensors of FIG. 1 and employs the various actuators of FIG. 1, such as throttle 64, fuel injectors 66 and 67, spark plug 91, etc., to adjust engine operation based on the received signals and instructions stored on a memory of the controller. As one example, the controller may send a pulse width signal to the port injector and/or the direct injector to adjust a timing of fuel injection and an amount of fuel delivered to a cylinder via an injector.

FIG. 2 schematically depicts an example embodiment 200 of a fuel system, such as fuel system 190 of FIG. 1. Fuel system 200 may be operated to deliver fuel to an engine, such as engine 10 of FIG. 1. Fuel system 200 may be operated by a controller to perform some or all of the operations described with reference to the methods of FIGS. 3 and 4. Components previously introduced are similarly numbered in FIG. 2. Engine 10 is shown with cylinder 30 arranged in a cylinder bank 202. The cylinder bank 202 may be one of a plurality of cylinder banks of the engine 10, each of the banks identical in configuration.

Fuel system 200 includes a fuel storage tank 210 for storing the fuel on-board the vehicle, a lower pressure fuel pump (LPP) 212 (herein also referred to as fuel lift pump 212), and a higher pressure fuel pump (HPP) 214 (herein also referred to as fuel injection pump 214). Fuel may be provided to fuel tank 210 via a fuel filling passage 204. In one example, LPP 212 may be an electrically-powered lower pressure fuel pump disposed at least partially within fuel tank 210. LPP 212 may be operated by a controller 12 (e.g., controller 12 of FIG. 1) to provide fuel to HPP 214 via fuel passage 218. LPP 212 can be configured as what may be referred to as a fuel lift pump. As one example, LPP 212 may be a turbine (e.g., centrifugal) pump including an electric (e.g., DC) pump motor, whereby the pressure increase across the pump and/or the volumetric flow rate through the pump may be controlled by varying the electrical power provided to the pump motor, thereby increasing or decreasing the motor speed. For example, as the controller reduces the electrical power that is provided to lift pump 212, the volumetric flow rate and/or pressure increase across the lift pump may be reduced. The volumetric flow rate and/or pressure increase across the pump may be increased by increasing the electrical power that is provided to lift pump 212. As one example, the electrical power supplied to the lower pressure pump motor can be obtained from an alternator or other energy storage device on-board the vehicle (not shown), whereby the control system can control the electrical load that is used to power the lower pressure pump. Thus, by varying the voltage and/or current provided to the lower pressure fuel pump, the flow rate and pressure of the fuel provided at the inlet of the higher pressure fuel pump 214 is adjusted.

LPP 212 may be fluidly coupled to a filter 217, which may remove small impurities contained in the fuel that could potentially damage fuel handling components. A check valve 213, which may facilitate fuel delivery and maintain fuel line pressure, may be positioned fluidly upstream of filter 217. With check valve 213 upstream of the filter 217, the compliance of low-pressure passage 218 may be increased since the filter may be physically large in volume.

Furthermore, a pressure relief valve 219 may be employed to limit the fuel pressure in low-pressure passage 218 (e.g., the output from lift pump 212). Relief valve 219 may include a ball and spring mechanism that seats and seals at a specified pressure differential, for example. The pressure differential set-point at which relief valve 219 may be configured to open may assume various suitable values; as a non-limiting example, the set-point may be 6.4 bar or 5 bar (g). An orifice 223 may be utilized to allow for air and/or fuel vapor to bleed out of the lift pump 212. This bleed at orifice 223 may also be used to power a jet pump used to transfer fuel from one location to another within the tank 210. In one example, an orifice check valve (not shown) may be placed in series with orifice 223. In some embodiments, fuel system 200 may include one or more (e.g., a series) of check valves fluidly coupled to low-pressure fuel pump 212 to impede fuel from leaking back upstream of the valves. In this context, upstream flow refers to fuel flow traveling from fuel rails 250, 260 towards LPP 212 while downstream flow refers to the nominal fuel flow direction from the LPP towards the HPP 214 and thereon to the fuel rails.

Fuel lifted by LPP 212 may be supplied at a lower pressure into a fuel passage 218 leading to an inlet 203 of HPP 214. HPP 214 may then deliver fuel into a first fuel rail 250 coupled to one or more fuel injectors of a first group of direct injectors 252 (herein also referred to as a plurality of first injectors). Fuel lifted by the LPP 212 may also be supplied to a second fuel rail 260 coupled to one or more fuel injectors of a second group of port injectors 262 (herein also referred to as a plurality of second injectors). HPP 214 may be operated to raise the pressure of fuel delivered to the first fuel rail above the lift pump pressure, with the first fuel rail coupled to the direct injector group operating with a high pressure. As a result, high pressure DI may be enabled while PFI may be operated at a lower pressure.

While each of first fuel rail 250 and second fuel rail 260 are shown dispensing fuel to four fuel injectors of the respective pluralities of first and second injectors 252, 262, it will be appreciated that each fuel rail 250, 260 may dispense fuel to any suitable number of fuel injectors. As one example, first fuel rail 250 may dispense fuel to one fuel injector of plurality of first injectors 252 for each cylinder of the engine while second fuel rail 260 may dispense fuel to one fuel injector of the plurality of second injectors 262 for each cylinder of the engine. Controller 12 can individually actuate each of the plurality of second injectors 262 via a port injection driver 237 and actuate each of the plurality of first injectors 252 via a direct injection driver 238. The controller 12, the drivers 237, 238 and other suitable engine system controllers can comprise a control system. While the drivers 237, 238 are shown external to the controller 12, it should be appreciated that in other examples, the controller 12 can include the drivers 237, 238 or can be configured to provide the functionality of the drivers 237, 238.

HPP 214 may be an engine-driven, positive-displacement pump. As one non-limiting example, HPP 214 may be a Bosch HDP5 high pressure pump, which utilizes a solenoid activated control valve (e.g., fuel volume regulator, magnetic solenoid valve, etc.) to vary the effective pump volume of each pump stroke. The outlet check valve of HPP is mechanically controlled and not electronically controlled by an external controller. HPP 214 may be mechanically driven by the engine in contrast to the motor driven LPP 212. HPP 214 includes a pump piston 228, a pump compression chamber 205 (herein also referred to as compression chamber), and a step-room 227. Pump piston 228 receives a mechanical input from the engine crank shaft or cam shaft via cam 230, thereby operating the HPP according to the principle of a cam-driven single-cylinder pump.

A lift pump fuel pressure sensor 231 may be positioned along fuel passage 218 between lift pump 212 and higher pressure fuel pump 214. In this configuration, readings from sensor 231 may be interpreted as indications of the fuel pressure of lift pump 212 (e.g., the outlet fuel pressure of the lift pump) and/or of the inlet pressure of higher pressure fuel pump. Readings from sensor 231 may be used to assess the operation of various components in fuel system 200, to determine whether sufficient fuel pressure is provided to higher pressure fuel pump 214 so that the higher pressure fuel pump ingests liquid fuel and not fuel vapor, and/or to minimize the average electrical power supplied to lift pump 212.

First fuel rail 250 includes a first fuel rail pressure sensor 248 for providing an indication of direct injection fuel rail pressure to the controller 12. Likewise, second fuel rail 260 includes a second fuel rail pressure sensor 258 for providing an indication of port injection fuel rail pressure to the controller 12. An engine speed sensor 233 (or an engine angular position sensor from which speed is deduced) can be used to provide an indication of engine speed to the controller 12. The indication of engine speed can be used to identify the speed of higher pressure fuel pump 214, since the pump 214 is mechanically driven by the engine, for example, via the crankshaft or camshaft. A solenoid controlled valve 221 may be included on the inlet side of pump 214. This solenoid controlled valve 221 may have two positions, a first pass through position and a second checked position. In the pass through position, no net pumping into the fuel rail 250 occurs. In the checked position, pumping occurs on the compression stroke of plunger/piston 228. This solenoid valve 221 is synchronously controlled with its drive cam to modulate the fuel quantity pumped into fuel rail 260.

First fuel rail 250 is coupled to an outlet 208 of HPP 214 along fuel passage 278. A check valve 274 and a pressure relief valve (also known as pump relief valve) 272 may be positioned between the outlet 208 of the HPP 214 and the first (DI) fuel rail 250. The pump relief valve 272 may be coupled to a bypass passage 279 of the fuel passage 278. Outlet check valve 274 opens to allow fuel to flow from the high pressure pump outlet 208 into a fuel rail only when a pressure at the outlet of direct injection fuel pump 214 (e.g., a compression chamber outlet pressure) is higher than the fuel rail pressure. The pump relief valve 272 may limit the pressure in fuel passage 278, downstream of HPP 214 and upstream of first fuel rail 250. For example, pump relief valve 272 may limit the pressure in fuel passage 278 to 200 bar. Pump relief valve 272 allows fuel flow out of the DI fuel rail 250 toward pump outlet 208 when the fuel rail pressure is greater than a predetermined pressure. Valves 244 and 242 work in conjunction to keep the low pressure fuel rail 260 pressurized to a pre-determined low pressure. Pressure relief valve 242 helps limit the pressure that can build in fuel rail 260 due to thermal expansion of fuel.

Based on engine operating conditions, fuel may be delivered by one or more of the pluralities of first and second injectors 252, 262. For example, during high load conditions, fuel may be delivered to a cylinder on a given engine cycle via only direct injection, wherein port injectors 262 are disabled (e.g., not injecting fuel). In another example, during mid-load conditions, fuel may be delivered to a cylinder on a given engine cycle via each of direct and port injection. As still another example, during low load conditions, engine starts, as well as warm idling conditions, fuel may be delivered to a cylinder on a given engine cycle via only port injection, wherein direct injectors 252 are disabled.

It is noted here that the high pressure pump 214 of FIG. 2 is presented as an illustrative example of one possible configuration for a high pressure pump. Components shown in FIG. 2 may be removed and/or changed while additional components not presently shown may be added to pump 214 while still maintaining the ability to deliver high-pressure fuel to a direct injection fuel rail and a port injection fuel rail.

Controller 12 can also control the operation of each of fuel pumps 212 and 214 to adjust an amount, pressure, flow rate, etc., of a fuel delivered to the engine. As one example, controller 12 can vary a pressure setting, a pump stroke amount, a pump duty cycle command, and/or fuel flow rate of the fuel pumps to deliver fuel to different locations of the fuel system. A driver (not shown) electronically coupled to controller 12 may be used to send a control signal to the low pressure pump, as required, to adjust the output (e.g., speed, flow output, and/or pressure) of the low pressure pump.

The fuel injectors may have injector-to-injector variability due to manufacturing, as well as due to age. Ideally, for improved fuel economy, injector balancing is desired wherein every cylinder has matching fuel injection amounts for matching fuel delivery commands. By balancing air and fuel injection into all cylinders, engine performance is improved. In particular, fuel injection balancing improves exhaust emission control via effects on exhaust catalyst operation. In addition, fuel injection balancing improves fuel economy because fueling richer or leaner than desired reduces fuel economy and results in an inappropriate ignition timing for the actual fuel-air ratio (relative to the desired ratio). Thus, getting to the intended relative fuel-air ratio has both a primary and secondary effect on maximizing the cylinder energy for the fuel investment.

Fueling errors can have various causes in addition to injector-to-injector variability. These include cylinder-to-cylinder misdistribution, shot-to-shot variation, and transient effects. In the case of injector-to-injector variability, each injector may include a different error between what is commanded to be dispensed and what is actually dispensed. As such, fuel injector balancing may result in an engine's torque evenness. Air and fuel evenness improves emission control.

In one example, during a PBIB diagnostic, one of the plurality of first injectors 252 or the plurality of second injectors 262 may be monitored. In one example, if the plurality of first injectors 252 is being balanced during the PBIB diagnostic, then the pump 214 may be sealed from the first fuel rail 250. Sealing the pump 214 from the first fuel rail 250 may include deactivating the pump 214, closing a valve, or the like. The PBIB diagnostic may further include adjusting an injection timing of the injectors such that injection overlap does not occur. Additionally or alternatively, an inter-injection period, which corresponds to a period of time between sequential injections, may meet a threshold duration, which may be based on a non-zero, positive number. The PBIB diagnostic may further include adjusting a fuel injection pattern such that only injections from a single cylinder bank occur. The FRP of the inter-injection period between injections of the same-cylinder bank may be learned by the controller and used to adjust an injector to injector variability. In some examples, FRPs of different cylinder banks may be learned, which may then be cumulatively used to correct injector to injector variability across multiple banks of the engine.

During balancing of the amount of fuel injected by a plurality of fuel injectors, a first fuel mass error of a second fuel injector may be estimated based on each of an estimated average fuel rail pressure during an inter-injection period between fuel injection by a first fuel injector and fuel injection by the second fuel injector and an estimated average fuel rail pressure during another inter-injection period between the fuel injection by the second fuel injector and fuel injection by a third fuel injector. Subsequent engine fueling may be adjusted based on the learned fuel mass errors.

In one example, a method may be executed in combination with the systems of FIGS. 1 and 2. The method may include adjusting a fuel injection pattern during a fuel injector diagnostic to inject fuel from only a plurality of first injectors of a first bank while skipping fuel injections from a plurality of second injectors of a second bank. The plurality of first injectors and the plurality of second injectors are direct injectors positioned to inject directly into combustion chambers of the first bank and the second bank, respectively. When fuel injections from the plurality of second injectors (e.g., direct injectors) of the second cylinder bank are skipped, port-fuel injectors of the second cylinder bank may be increased to compensate for the missing fuel. Combustion in the cylinders of the second bank may still occur during the skipping. A preceding and subsequent fuel rail pressure for each injection of the plurality of first injectors in the first cylinder bank may be learned and used to correct a fueling error across the injectors. The method may further include transitioning from injecting with only the first cylinder bank direct injectors to injecting with only the second cylinder bank direct injectors while skipping the first cylinder bank direct injectors. Thus, the first cylinder bank may be fueled via only port-fuel injectors following the transition. During the transition, a first direct injection of a direct injector of the second cylinder bank may be excluded from PBIB learning, and wherein subsequent FRPs following the first direction injection are learned. In one example, learned FRPs from each of the cylinder banks may be used to determine an average error across both banks, wherein a fueling correction may be based on the average error. Additionally or alternatively, the average error may be determined for each individual bank, or each individual injector.

Turning now to FIG. 3, an example method for carrying out pressure based injector balancing for the engine fuel injectors is shown at 300. The method enables the injection volume dispensed by the fuel injector on the given fuel injection event to be accurately determined and used for balancing injector errors. Instructions for carrying out method 300 may be executed by a controller based on instructions stored on a memory of the controller and in conjunction with signals received from sensors of the engine system, such as the sensors described above with reference to FIGS. 1-2. The controller may employ engine actuators of the engine system to adjust engine operation, according to the methods described below.

At 302, the method 300 includes estimating and/or measuring engine operating conditions. Engine operating conditions may include but are not limited to one or more of engine speed, torque demand, manifold pressure, manifold air flow, ambient conditions (ambient temperature, pressure, and humidity, for example), engine dilution, exhaust-gas recirculate (EGR flow rate), and the like.

At 304, the method 300 includes determining if pressure based injector balancing (PBIB) conditions are met for the engine fuel injectors (such as direct injectors 252 or port fuel injectors 262 in FIG. 2). PBIB learning may be performed to learn a variation in injector errors. As such, each injector may have an error between the commanded fuel mass to be delivered and the actual fuel mass that was delivered. By learning individual injector errors, the errors may be balanced so that all injectors move towards a common error value. PBIB learning may be performed at selected conditions such as when engine speed is lower than a threshold speed, while injector pulse-width (PW) is lower than a threshold PW, and when multiple injectors are not scheduled to deliver concurrently. At high engine speeds or large fuel pulse-widths the DI injection periods may overlap, thus substantially eliminating an inter-injection period. In one example, the threshold speed and the threshold speed and the threshold PW are based on non-zero, positive numbers. When injector overlap occurs, an inter-injection period ceases to exists, thereby disabling any PBIB learning from being performed. If PBIB conditions are not confirmed, then at 306, the method includes continuing fuel injection without performing PBIB.

If conditions are met for carrying out PBIB, then the method 300 may proceed to 308, which includes executing skip/fire PBIB learning. The skip/fire PBIB learning may include where some direct injectors are activated and some direct injectors are deactivated. In one example, the activation and deactivation is based on inter-bank injections. That is to say, for an engine comprising two or more cylinder banks, a direct injector injecting to a cylinder of a first bank may not be included in the PBIB learning if a preceding fuel injection occurred in a second bank different than the first bank. The skip/fire PBIB learning routine is described in greater detail herein.

The method 300 may proceed to 310, which includes determining if a preceding direct injection was provided from an injector of an opposite bank. As such, port-fuel injections may not affect a fuel rail pressure (FRP) of the direct injector fuel rail. In one example, for an 8-cylinder engine arranged in a V configuration (e.g., a V-8), there may be two separate cylinder banks, a first cylinder bank including four cylinders and a second cylinder bank including a different four cylinders. Each of the cylinders may include a direct injector positioned to inject fuel directly into a combustion chamber thereof, as described above with respect to FIG. 2. A common high-pressure fuel rail may supply fuel to each of the fuel injectors. Direct injections may generate resonance pressure oscillations in the fuel rail, which may impact a sensing of the FRP, as described in greater detail with respect to FIG. 5B. More specifically, resonant pressure oscillations following a first direct injection from a direct injector of the first bank is out-of-phase compared to resonant pressure oscillations following a preceding second direct injection from a direct injector of the second (opposite) bank. The out-phase oscillations are amplified when computing the drop in FRP from the first direct injection (subtracting out-of-phase oscillations of similar amplitudes results in an oscillating pressure difference with approximately double the oscillation amplitude). Thus, if the preceding direct injection was from an injector of an opposite cylinder bank, then the method 300 may proceed to 312, which includes not learning the preceding and subsequent FRP for the injector currently injecting.

However, if the preceding direct injection is not from the opposite bank and thus is from the same cylinder bank, then the method 300 may proceed to 314, which includes learning the preceding and subsequent FRP for the injector current injecting. Resonant pressure oscillations following a first direct injection from a direct injector of the first bank is in-phase compared to resonant pressure oscillations from a preceding second direct injection from a direct injector of the first (same) bank. The in-phase oscillations cancel out when computing the drop in FRP from the first direct injection (subtracting in-phase oscillations of similar amplitudes results a pressure difference with approximately zero oscillations). The drop in FRP, based on a difference between the preceding and subsequent FRP of the injector currently injecting, may correspond to an actual amount of fuel injected by the direct injector. The drop in FRP may be compared to a desired amount of fuel injected to determine a direct injector error.

The method 300 may proceed to 316, which includes incrementing a learned FRP counter for the injector. In one example, the learned FRP counter increases only after a fuel rail pressure is learned following a direct injection of a single direct injector. As such, a counter may not be increased at 312.

Following 312 and 316, the method 300 may proceed to 318, which includes determining if a threshold number of FRP values is learned for each injector. The threshold number may be based on a non-zero, positive number. In one example, the threshold number is greater than three. If the threshold number of FRP values is learned for each injector, then the method 300 may proceed to 320, which includes exiting PBIB. As such, direct injections may be executed based on, for example, engine load, and not PBIB diagnostics.

If the threshold number of FRP values is not learned for each injector, then the method 300 may proceed to 322, which includes adjusting an injector skip/fire order. In one example, the adjusting includes prioritizing direct injectors with a number of learned FRP values being less than the threshold number.

The method 300 may proceed to 324, which includes skipping injectors from an opposite bank prior to injecting with injectors with less than the threshold number of learned FRP values. Thus, if an injector of the first bank is short a number of learned FRP values relative to the threshold number, then an injector from the second bank scheduled to inject preceding the injector of the first bank may be skipped. Skipping the injector may include where the injector is deactivated and fuel is not injected therefrom. Thus, the port-fuel injector of the cylinder with the skipped direct injector may be signaled to inject all of a desired fuel amount. In this way, the fuel rail pressure may not decrease when an injector is skipped. Thus, the counter of the injector with less than the threshold number of learned FRP values may increase following its injection.

The method 300 may proceed to 326, which may include determining if PBIB conditions are still met. PBIB conditions are described above with respect to step 304.

If PBIB conditions are still met, the method 300 may proceed to 328, which includes continuing to learn FRP values and incrementing the counter for each injector in which an FRP value is learned. The method may continue to monitor if PBIB conditions are met.

If PBIB conditions are no longer met, then the method 300 may proceed to 330, which includes exiting PBIB. Exiting PBIB may include adjusting direct injection parameters as described above with respect to step 320.

The method 300 may proceed to 332, which includes prioritizing injectors with less than the threshold number of learned FRP values the next time PBIB conditions are met and PBIB learning resumes. The prioritizing may include adjusting an injector injecting sequence to allow the direct injectors with less than the threshold number of learned FRP values to inject during conditions where an opposite bank injector is not injecting. By doing this, the FRP values learned may be more accurate, which may enhance fueling corrections provided by the PBIB diagnostic, thereby increasing engine power output and decreasing emissions.

Turning now to FIG. 4, it shows a method 400 for adjusting fueling parameters based on the learned FRP of method 300 of FIG. 3. In one example, method 400 is a sub-routine of the PBIB diagnostic of method 300 of FIG. 3.

In one example, the PBIB diagnostic is configured to measure an actual fuel quantity injected and compare the actual fuel quantity to a desired or an intended fuel quantity. PBIB may then be used to reduce injector-to-injector variability, and may apply fueling corrections to inject equal amounts of fuel across all injectors of a single cylinder bank or multiple cylinder banks. In one example, the correction may be applied based on an average error across a group of injector or based on an error of each individual injector.

The method 400 begins at 402, which includes determining if a threshold number of FRP values is learned for one or more direct injectors, similar to 318 of method 300. If the threshold number of FRP values is not learned for any of the direct injectors, then the method 400 may proceed to 404, which includes not adjusting direct injection parameters. Additionally or alternatively, a flag may be set to execute the PBIB diagnostic of FIG. 3 when conditions are met.

If the threshold number of FRP values are learned for one or more of the direct injectors, then the method 400 may proceed to 406, which includes determining an average FRP decrease following each injection. The average FRP decrease may be determined for each individual injector based on its learned FRP values based on the following equation (1):

$$\overline{\Delta FRP} = \frac{1}{n}\sum_{m=1}^{n} x_m \qquad (1)$$

The method 400 may proceed to 408, which includes estimating an average injection mass based on the average ΔFRP. In one example, a map correlating pressure drop with injection mass may be used for estimating the dispensed fuel mass. In one example, there may a linear relation between drop in fuel rail pressure over an injection event and the fuel mass dispensed by an injector during that injection event. In other examples, a model, transfer function, look-up table, or algorithm may be used to learn the dispensed fuel mass based on the pressure drop. The actual mass injected is further based on the bulk modulus of the fuel, the fuel density, and the fuel rail volume. In one example, the actual mass injected is determined as per equation (2):

Actual mass injected=($\overline{\Delta FRP}$/bulk modulus)*fuel rail volume*fuel density (2)

The method 400 may proceed to 410, which includes learning an error between the average injection mass and an average of the commanded injection masses for each of the injections from the injector. An injector error between an intended injection mass that was commanded (based on the commanded duty cycle pulse width and average FRP at the time of the injection event) and the actual injection mass as computed from the pressure difference may be estimated. The computed difference in fuel mass is the injector error that is desired to be compensated for future injections (to balance injectors). Specifically, a fuel mass error for a given injector used to dispense fuel at the selected injection event is computed as a difference between the commanded fuel mass (determined based on commanded pulse-width) and the actual fuel mass (determined based on the measured pressure difference).

The method 400 may proceed to 412, which includes applying a fueling correction to injectors with a difference between the actual injection mass and the commanded injection mass. The fueling correction being based on the difference. In one example, as the difference increases, then the fueling correction may also increase, wherein the fueling correction include adjusting a PW signaled to an actuator of the injector. In one example, if the difference corresponds to the actual injection mass being less than the commanded injection mass, then the fueling correction may include increase the PW provided to open the injector for a longer duration of time, and therefor inject more fuel. In one example, the fuel mass error for each injector is corrected individually. By doing this, fueling errors for each injector may be corrected more accurately compared to providing one correction based on an average error of all the injectors. In this way, fueling of each cylinder may be optimized, which may enhance an overall engine operation.

In some examples, additionally or alternatively, the fuel mass error for the given injector is then compared to the corresponding fuel mass error for other cylinders, or an average fuel mass error for all engine cylinder injectors. For example, the fuel mass error for a first direct injector via which fuel is dispensed into a first cylinder is compared to a fuel mass error for corresponding direct fuel injectors via which fuel is dispensed into each of the remaining engine cylinders over one or more engine cycles (where each cylinder is fueled once over the cycle). Based on the differences in fuel mass error between the injectors, a degree of balancing desired between injectors is determined. The corrections across all injectors are computed, averaged, and then the average is subtracted from the individual injector corrections to learn the remaining injector-to-injector corrections needed to balance the injectors without affecting the average fueling across the cylinders. In this way, the relative errors between fuel injectors are learned and corrected.

In one example, the methods of FIGS. 3 and 4 may include periodically or continuously characterizing an injector and then adjusting an injector command such that all injectors are injecting substantially identical amounts of fuel once their pulse-width is adjusted. As another example, additionally or alternatively, an average error across groups of injectors may be corrected such that the difference between an actual fuel mass injected and an intended fuel mass injected is equal to about 0.

Turning now to FIG. 5A, it shows an embodiment of an engine 500 comprising a first cylinder bank 502 and a second cylinder bank 504. In one example, the first cylinder bank 502 is identical to the cylinder bank 202 of FIG. 2. Thus, the first cylinder bank 502 includes a plurality of port-fuel injectors (PFI) and a plurality of direct injectors (DI). The second cylinder bank 504 is identical to the first cylinder bank 502 in a number of cylinders and number of fuel injectors. In the example of FIG. 5A, the first cylinder bank 502 and the second cylinder bank 504 include an equal number of cylinders arranged in a V-8 configuration. The engine 500 may include a cross-plane crank or flat-plane crank. It will be appreciated that the engine 500 may include other configurations and numbers of cylinders without departing from the scope of the present disclosure. For example, the engine 500 may be a V-6 engine or a W-16 engine or other type of engine.

Cylinders of the first and second cylinder banks are numbered sequentially, wherein cylinders of the first cylinder bank 502 are numbered, 1, 2, 3, and 4 and cylinders of the second cylinder bank 504 are numbered 5, 6, 7, and 8. Subscript numbering, herein referred to as a cylinder index number, corresponds to an injection pattern of the direct injectors of the cylinders. For example, cylinder 1 of the first cylinder bank 502 may receive a direct injection before the other cylinders. Cylinder 3 of the first cylinder bank 502 may be the second cylinder to receive a direct injection, followed by cylinder 7 of the second cylinder bank 504, then cylinder 2 of the first bank 502, then cylinder 6 of the second cylinder bank 504, then cylinder 5 of the second bank, then cylinder 4 of the first bank 502, and lastly followed by cylinder 8 of the second bank 504. Thus, in the example of FIG. 5A, the traditional injection pattern is 1-3-7-2-6-5-4-8 during operating conditions outside of the PBIB diagnostic, wherein each of the injectors is configured to inject.

Turning now to FIG. 5B, it shows a plurality of graphs 525 illustrating FRP traces following preceding injections added to the set of FRP traces following current injections. In each graph of the plurality of graphs 525, the preceding injection FRP is the upper plot and the current injection FRP is the lower plot. In the example of FIG. 5B based on the injection pattern of FIG. 5A, six of the eight injections are preceded by an opposite bank injection. Said another way, six of the eight injections includes where a first cylinder bank injection precedes a second cylinder bank injection or vice-versa. These injections include cylinder index numbers 0, 3, and 6 for the first cylinder bank 502 and 2, 4, and 7 for the second cylinder bank 504. This results in the out-of-phase oscillations between the upper and lower plots of each graph of the plurality of graphs 525.

In one example, FIG. 5B illustrates the error that arises from taking the difference between average FRPs from different rails of different cylinder banks. The rails have a naturally occurring oscillation between them that are out of phase. However, same cylinder bank oscillations of inter-injection FRP averages may be in-phase and subtracted in-phase, the error may be reduced and/or eliminated compared to subtracting anti-phase inter-injection FRP averages of rails of different cylinder banks.

In one example, when computing FRP drops, a measurement error, due to resonant oscillations, may cancel out when a previous injection is from the same cylinder bank. This occurs in two out of the eight cylinders based on the injection pattern of FIG. 5A, wherein the upper and lower plots illustrate in-phase oscillations in the graphs corresponding to the cylinder index numbers 1 and 5. As illustrated, cylinder index number 1 of the first cylinder bank 502, preceded by cylinder index number 0, and cylinder index number 5 of the second cylinder bank 504, preceded by cylinder index number 4, are the only cylinders of the injection pattern of FIG. 5A in which an FRP decrease may be learned with reduced error. That is to say, the measurement error may increase if a previous injection is from a different bank. In one example, the measurement error doubles if the injection is from a different bank. Thus, executing PBIB based on the injection pattern of FIG. 5A, which may be a common injection pattern for a V-8 engine, may be inefficient and difficult to execute during a time period in which PBIB conditions are met.

In one example, a fuel injection pattern with six cylinders preceded by opposite bank cylinders & two cylinders preceded by same bank cylinders is expected on a V8 with cross-plane crankshaft. A V8 with flat-plane crankshaft on the other hand results in a pattern where all 8 cylinders are preceded by opposite bank cylinders (as firing order alternates fired cylinder between the 2 banks), thereby leading to errors on all cylinder PBIB measurements without an adjusting injection pattern.

In one example, averaging the FRP over an inter-injection period following a direct injection from a direct injector from the first bank may result in a +4% error due to resonant pressure oscillations, and averaging the FRP over an inter-injection pressure following a direct injection from a direct injector from the second bank may result in a −4% error due resonant pressure oscillations with similar amplitudes with opposite phases. The oscillation amplitude determines the magnitude of the error (e.g. absolute value of error=4%) for a given inter-injection period, oscillation period, oscillation decay coefficient etc., while the oscillation phase determines the sign of the error (e.g. error>0 for the first bank and error<0 for the second bank).

The drop in FRP (ΔFRP) from a direct injection from cylinder index 2 of the second bank is computed by subtracting the average inter-injection FRP following the direct injection from cylinder index 2 of the second bank (with a −4% error) from the average inter-injection FRP following the preceding direct injection from cylinder index 1 of the (opposite) first bank (with a +4% error). The error in ΔFRP is doubled: Δerror=4%−(−4%)=8%.

The drop in FRP (ΔFRP) from a direction injection from cylinder index 5 of the second bank is computed by subtracting the average inter-injection FRP following the direct injection from cylinder index 5 of the second bank (with a −4% error) from the average inter-injection FRP following the preceding injection from cylinder index 4 of the (same) second bank (with a −4% error). The error in ΔFRP is cancelled: Δerror=(−4%)−(−4%)=0%.

Thus, as will be described herein, unconventional injection firing patterns may be incorporated to prioritize same cylinder bank injections for injections from an injector demanding a greater number of learned FRP values. In one example, only FRP drops with in-phase preceding and subsequent oscillations are included in PBIB calculations. Said another way, only FRP values from injector preceded by a same cylinder bank injection are included in PBIB learning.

Turning now to FIG. 5C, it shows an example injection pattern 550. The injection pattern 550 may include where only preceding and subsequent FRP values of a single injector are measured (for each group of injections enclosed by brackets), resulting in a fire 1/skip 7 pattern. Cylinder index numbers in a dashed box may correspond to a transitional injection from one cylinder bank to another, wherein an FRP value of the transitional injection is not learned. FRP values for cylinder index numbers between brackets may be learned since a preceding injection was from a same cylinder bank (e.g., the transitional injection). Thus, in the example of FIG. 5C, each injector is signaled to inject four times, a first injection corresponding to the transitional injection, and the last three injections corresponding to injections in which FRP values are measured and learned. Between each injection of the four for the single injector, injections for the other seven injectors are skipped.

In the example of the FIG. 5C, the injection of cylinder index number 1 and the injection of cylinder index number 5 in the dashed box may be included in the learned FRP values. That is to say, transitional injections may not be demanded for cylinder index number 1 and 5 in the example of FIG. 5C. However, FIG. 5C is merely one example of a fire 1/skip 7 (F1/S7) approach which may be reorganized such that an injector injects a transitional injection prior to learning FRP values of the injector. Thus, the injections in the dashed boxes for cylinder index numbers 1 and 5 may be discarded to promote symmetric injector usage (e.g., same number of injections from all injectors and a same number of injections included in PBIB for all injectors).

Turning now to FIG. 5D, it shows an example 575 of another injection pattern where a greater number of injector FRP values may be learned during a full injector loop relative to the example of FIG. 5C. In the example 575, transitional injections precede a group of injections suitable for FRP value learning. For example, injector of cylinder index number 0 injects, and is then following by a full injector loop. Only injectors of cylinder index numbers 1, 3, 6 and 0 are fired. As shown in FIG. 5A, cylinder index numbers 1, 3, 6, and 0 are cylinders of the first cylinder bank 502 of FIG. 5A. Thus, FRP values of an entire cylinder bank may be learned during one full injector loop and one transitional injection.

To learn the FRP values of the other cylinder bank, a transitional injection is injected. In the example of FIG. 5D, the transitional injection is injected by the injector of cylinder index number 4. Following the transitional injection, FRP values for cylinder index numbers 5, 7, 2, and 4 are learned, wherein cylinder index number 5, 7, 2, and 4 correspond to cylinders of the second cylinder bank 504 of FIG. 5A. The PBIB diagnostic may repeat this injection pattern until PBIB conditions are no longer met or until a desired number of FRP values are gathered for each injector.

Turning now to FIG. 6, it shows a graph 600 illustrating the injection pattern of example 575 of FIG. 5D. Cylinder index number is plotted along the abscissa and FRP is plotted along the ordinate. The injection pattern begins with an injection from a direct injector of cylinder index number 4. The first 90° crank angle (CA) portion of the inter-injection period following the injection from the direct injector of cylinder index number 4 is shown within dotted box 602. A true average FRP is shown by a dashed line. Due to resonance, FRP may oscillate around the true average. For example, FRP may first decrease to a minimum value below the true average FRP, then increase to a maximum value above the true average, and then decrease again to a minimum value below the true average during the first 90° CA interval following the injection from the injector of cylinder index number 4.

The first 90° crank angle (CA) portion of the inter-injection period following another injection from the direct injector of cylinder index number 4 is shown within dotted box 614, and the first 90° crank angle (CA) portion of the inter-injection period following an injection from a direct injector of cylinder index number 5 is shown within dotted box 616. FRP oscillations within dotted boxes 614 and 616 may first decrease to a minimum value below a true FRP average (dashed line) then increase to a maximum value above the true average then decrease again to a minimum value below the true average similar to FRP oscillations within dotted box 602 as they all follow injections from injectors from the same second cylinder bank. The FRP oscillations within dotted boxes 602, 614 and 616 are said to be in-phase (relative to each other).

The first 90° crank angle (CA) portion of the inter-injection period following an injection from a direct injector of cylinder index number 0 is shown within dashed box 604. A true average FRP is shown by a dashed line. Due to resonance, FRP may oscillate around the true average. The FRP oscillations following the injection from the injector of cylinder index number 0 may be in the opposite direction compared to the FRP oscillation from an injection from the injector of cylinder index number 4 (e.g. within dotted box 602) as cylinder index number 0 and cylinder number index 4 are on opposite banks. For example, FRP may first increase to a maximum value above the true average FRP, then decrease to a minimum value below the true average, and then increase again to a maximum value above the true average during the first 90° CA interval following the injection from the injector of cylinder index number 0. FPR oscillations within dotted box 602 and FRP oscillations within dashed box 604 are said to be out-of-phase (relative to each other).

FRP oscillations within dashed boxes 606, 608, 610 and 612 may first increase to a maximum value above the true average FRP, then decrease to a minimum value below the true average, and then increase again to a maximum value above the true average during the first 90° CA interval following an injection similar to FRP oscillations within dashed box 604 as they all follow injections from injectors from the same first bank. The FRP oscillations within dashed boxes 604, 606, 608 and 612 are said to be in-phase (relative to each other). Any FRP oscillation within dashed boxes 604, 606, 608 and 612 is out-of-phase compared to any FRP oscillation within dotted boxes 602, 614 and 616.

An average FRP may be estimated following an injection by averaging the FRP samples within a 90° crank angle (CA) portion of the inter-injection period following the injection (e.g. dotted box 602) such that a similar number of FRP samples is used for all injectors. The estimated average FRP within dotted box 602 is shown by a dotted line. The resonant oscillation may result in a bias error in the estimated average. Averaging the FRP samples within dotted box 602 may under-estimate the average FRP (negative bias error) as around two thirds of the FRP samples are below the true FRP average and one third of the FRP samples are above the true average. The estimated FRP average (dotted line) is therefore below the actual FRP average (dashed line).

Injections from injectors of cylinder index numbers 5, 6, and 7 are skipped resulting in a FRP remaining substantially constant. Injector of cylinder index number 0 injects following cylinder index number 4. An estimated average FRP following the injection from the injector of cylinder index number 0 is shown by a dotted line and a true average FRP is shown by a dashed line within the dashed box 604. The resonant oscillation may result in a bias error in the estimated average. Averaging the FRP samples within dashed box 604 may over-estimate the average FRP (positive bias error) as around two thirds of the FRP samples are above the true FRP average and one third of the FRP samples are below the true average. The estimated FRP average (dotted line) is therefore above the actual FRP average (dashed line). The out-of-phase oscillation following cylinder index number 4 (within dotted box 602) compared to the oscillation following cylinder index number 0 (within dashed box 604) results in a bias error being amplified (a positive bias error is subtracted from a negative bias error). Thus, injection from the injector of cylinder index number 0 following cylinder index number 4 is a transitional injection and may not be included in PBIB learning.

Following the injection from the injector of cylinder index number 0, the injector of cylinder index number 1 injects. Cylinder index numbers 0 and 1 are arranged on the same cylinder bank and result in an in-phase oscillation, highlighted by dashed boxes 604 and 606. Thus, both bias errors may have similar magnitudes and a same (positive) sign. This may result in the bias error being cancelled when computing a ΔFRP, wherein the ΔFRP, based on the preceding and subsequent FRPs, may then be included PBIB learning for the injector of cylinder index number 1.

Cylinder index number 2 is skipped to allow the cylinder bank including cylinders 1, 3, 6, and 0 to continue PBIB learning for a single cylinder bank. The injector of cylinder index number 3 injects, wherein the FRP oscillation following cylinder index number 3, highlighted by dashed box 608, is in-phase with FRP oscillation following cylinder index number 1, as highlighted by dashed box 606. Thus, the FRP highlighted by dashed boxes 608 and 606 may be used to determine a drop in FRP for the injector of cylinder index number 3 for PBIB learning.

Cylinder index numbers 4 and 5 are skipped, resulting in no FRP drop. The injector of cylinder index number 6 injects, wherein the FRP oscillation of the inter-injection period following cylinder index number 6, highlighted by dashed box 610, is in-phase with the FRP oscillation of the inter-injection period following cylinder index number 3 (dashed box 608). As such, FRPs of dashed boxes 608 and 610 may be learned for the injector of cylinder index number 6 to determine inter-injection FRP decrease, wherein adjustments to injection parameters may be based on a difference between the drop and a desired drop.

Cylinder index number 7 is skipped since it is included in an opposite cylinder bank and the injector of cylinder index number 0 injects. An inter-injection FRP following the injection is highlighted by dashed box 612, wherein the inter-injection FRP oscillation is in-phase with the inter-injection FRP following cylinder index number 6. As such, the FRP drop between the two FRPs of dashed boxes 612 and 610 may be used for the PBIB learning of the injector of cylinder index number 0.

Cylinder index numbers 1, 2, and 3 are scheduled to inject following cylinder index number 0. However, the injections are skipped as the PBIB routine transitions from one-cylinder bank to another. The injector of cylinder index number 4 injects, wherein an FRP oscillation of an inter-injection period following cylinder index number 4, highlighted by dotted box 614, is out of phase compared to the FRP oscillation following cylinder index number 0 (dashed box 612). As such, the drop in FRP from dashed boxes 612 and 614 may not be used to learn an FRP decrease during the PBIB routine for the injector of cylinder index number 4.

The injector of cylinder index number 5 may inject following the injector of cylinder index number 4. The FRP oscillation following cylinder index number 5, highlighted by dotted box 616, may be in-phase with the FRP oscillation following cylinder index number 4. As such, the FRPs of dotted boxes 614 and 616 may be used to learn a drop in FRP for the injector of cylinder index number 5.

In this way, a PBIB diagnostic routine may be enhanced by only learning FRP values when a preceding injection to a current injection is from a same cylinder bank. The PBIB diagnostic is further enhanced by skipping inter-bank injections. The technical effect of skipping inter-bank injections is to increase a number of same cylinder bank injections, which may increase a rate at which FRP values are learned. By doing this, the PBIB diagnostic may be executed more quickly, resulting in faster injector error corrections.

An example of a method comprises adjusting a fuel injection pattern during a fuel injector diagnostic to inject fuel from only a plurality of first injectors of a first bank while skipping fuel injections from a plurality of second injectors of a second bank. A first example of the method further includes where the plurality of first injectors and the plurality of second injectors are direct injectors positioned to inject directly into cylinders of the first bank and the second bank, respectively. A second example of the method, optionally including the first example, further includes where combusting fuel in cylinders of the second bank during the skipping, wherein cylinders of the second bank receive fuel from only a plurality of port-fuel injectors. A third example of the method, optionally including one or more of the previous examples, further includes where learning a drop in a fuel rail pressure for each injection of the plurality of first injectors preceded by an injection from the plurality of first injectors. A fourth example of the method, optionally including one or more of the previous examples, further includes adjusting the fuel injection pattern during the fuel injector diagnostic to inject fuel from only the plurality of second injectors of the second bank while skipping fuel injections from the plurality of first injectors of the first bank. A fifth example of the method, optionally including one or more of the previous examples, further includes where adjusting the fuel injection pattern further comprises a transitional fuel injection, further comprising ignoring a drop in a fuel rail pressure following the transitional fuel injection. A sixth example of the method, optionally including one or more of the previous examples, further includes where learning the drop in the fuel rail pressure of the plurality of second injectors following the transitional fuel injection. A seventh example of the method, optionally including one or more of the previous examples, further includes where the transitional fuel injection includes injecting via only one of the plurality of second injectors.

An example of a system, comprises an engine, a first cylinder bank and a second cylinder bank comprising a plurality of cylinders, wherein each cylinder of the plurality of cylinders includes a direct injector configured to inject fuel directly therein and a port-fuel injector configured to inject fuel into an intake port thereof, and a controller with computer-readable instructions stored on non-transitory memory thereof that when executed cause the controller to execute a pressure-based injector balancing diagnostic in response to conditions, and learn only drops in fuel rail pressure for injections preceded by a same cylinder bank injection calculated based on differences of inter-injection pressures preceding and following injections of a same cylinder bank. A first example of the system further includes where the plurality of cylinders of the first cylinder bank and the second cylinder bank are arranged in a V-configuration. A second example of the system, optionally including the first example, further includes where the instructions further enable the controller to adjust a fuel injection pattern to inject via direct injectors and port-fuel injectors of the first cylinder bank and only port-fuel injectors of the second cylinder bank during a first portion of the pressure-based injector balancing diagnostic, and wherein the instructions further enable the controller to skip fuel injections of direct injectors of the second cylinder bank during the first portion. A third example of the system, optionally including one or more of the previous examples, further includes where the instructions further enable the controller to adjust the fuel injection pattern to inject via only port-fuel injectors of the first cylinder bank and direct injectors and port-fuel injectors of the second cylinder bank during a second portion of the pressure-based injector balancing diagnostic, and wherein the instructions further enable the controller to skip fuel injections of direct injectors of the first cylinder bank during the second portion. A fourth example of the system, optionally including one or more of the previous examples, further includes where the instructions further enable the controller to inject a transitional injection via an injector of the second cylinder bank during a transition from the first portion to the second portion of the pressure-based injector balancing diagnostic. A fifth example of the system, optionally including one or more of the previous examples, further includes where the instructions further enable the controller to inject via only one direct injector of only one cylinder of the plurality of cylinders, and wherein only drops in fuel rail pressures from the only one direct injector are learned based on differences of inter-injection pressure preceding and following the only one direct injector. A sixth example of the system, optionally including one or more of the previous examples, further includes where the instructions further enable the controller to adjusting fueling parameters based on a difference between a commanded injection amount and an actual injection amount, wherein the actual injection amount is estimated based on a learned decrease in inter-injection fuel rail pressure.

An example of a method for operating an engine in a vehicle comprising a controller with instructions stored in memory that cause the controller to execute the method, the method, comprising adjusting an injection pattern for a plurality of direct injectors of a first cylinder bank to include fuel injections from each direct injector in the first cylinder bank to be preceded by another fuel injection from another direct injector of the plurality of direct injectors in the first bank at least once, the adjusting further including skipping injections for a plurality of direct injectors of a second cylinder bank different than the first cylinder bank, and wherein the second cylinder bank is fueled by only a plurality of port-fuel injectors. A first example of the method further includes where adjusting fueling of the plurality of direct injectors of the first cylinder bank based on a learned decrease in fuel rail pressure. A second example of the method, optionally including the first example, further includes where adjusting the injection pattern to include fuel injections from each direct injector in the second cylinder bank to be preceded by another fuel injection from another direct injector of the plurality of direct injectors of the second bank at least once, the adjusting further including skipping injections for the plurality of direct injectors of the first cylinder bank, and wherein the first cylinder bank is fueled by only a plurality of port-fuel injectors. A third example of the method, optionally including one or more of the previous examples, further includes where ignoring a fuel injection from a direct injector of the second cylinder bank with a preceding injection by a fuel injector of the first bank. A fourth example of the method, optionally including one or more of the previous examples, further includes where the adjusting occurs during a fuel injector diagnostic, and wherein cylinders of each of the first cylinder bank and second cylinder bank are fueled during the fuel injector diagnostic.

FIGS. 1-2 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example.

As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
adjusting a fuel injection pattern during a fuel injector diagnostic to inject fuel from only a plurality of first injectors of a first bank while skipping fuel injections from a plurality of second injectors of a second bank.

2. The method of claim 1, wherein the plurality of first injectors and the plurality of second injectors are direct injectors positioned to inject directly into cylinders of the first bank and the second bank, respectively.

3. The method of claim 2, further comprising combusting fuel in cylinders of the second bank during the skipping, wherein cylinders of the second bank receive fuel from only a plurality of port-fuel injectors.

4. The method of claim 1, further comprising learning a drop in a fuel rail pressure for each injection of the plurality of first injectors preceded by an injection from the plurality of first injectors.

5. The method of claim 1, further comprising adjusting the fuel injection pattern during the fuel injector diagnostic to inject fuel from only the plurality of second injectors of the second bank while skipping fuel injections from the plurality of first injectors of the first bank.

6. The method of claim 5, wherein adjusting the fuel injection pattern further comprises a transitional fuel injection, further comprising ignoring a drop in a fuel rail pressure following the transitional fuel injection.

7. The method of claim 6, further comprising learning the drop in the fuel rail pressure of the plurality of second injectors following the transitional fuel injection.

8. The method of claim 6, wherein the transitional fuel injection includes injecting via only one of the plurality of second injectors.

9. A system, comprising:
an engine;
a first cylinder bank and a second cylinder bank comprising a plurality of cylinders, wherein each cylinder of the plurality of cylinders includes a direct injector configured to inject fuel directly therein and a port-fuel injector configured to inject fuel into an intake port thereof; and
a controller with computer-readable instructions stored on non-transitory memory thereof that when executed cause the controller to
execute a pressure-based injector balancing diagnostic in response to conditions; and
learn only drops in fuel rail pressure for injections preceded by a same cylinder bank injection calculated based on differences of inter-injection pressures preceding and following injections of a same cylinder bank.

10. The system of claim 9, wherein the plurality of cylinders of the first cylinder bank and the second cylinder bank are arranged in a V-configuration.

11. The system of claim 9, wherein the instructions further enable the controller to adjust a fuel injection pattern to inject via direct injectors and port-fuel injectors of the first cylinder bank and only port-fuel injectors of the second cylinder bank during a first portion of the pressure-based injector balancing diagnostic, and wherein the instructions further enable the controller to skip fuel injections of direct injectors of the second cylinder bank during the first portion.

12. The system of claim 11, wherein the instructions further enable the controller to adjust the fuel injection pattern to inject via only port-fuel injectors of the first cylinder bank and direct injectors and port-fuel injectors of the second cylinder bank during a second portion of the pressure-based injector balancing diagnostic, and wherein the instructions further enable the controller to skip fuel injections of direct injectors of the first cylinder bank during the second portion.

13. The system of claim 12, wherein the instructions further enable the controller to inject a transitional injection via an injector of the second cylinder bank during a transition from the first portion to the second portion of the pressure-based injector balancing diagnostic.

14. The system of claim 9, wherein the instructions further enable the controller to inject via only one direct injector of only one cylinder of the plurality of cylinders, and wherein only drops in fuel rail pressures from the only one direct injector are learned based on differences of inter-injection pressure preceding and following the only one direct injector.

15. The system of claim 9, wherein the instructions further enable the controller to adjusting fueling parameters based on a difference between a commanded injection amount and an actual injection amount, wherein the actual injection amount is estimated based on a learned decrease in inter-injection fuel rail pressure.

16. A method for operating an engine in a vehicle comprising a controller with instructions stored in memory that cause the controller to execute the method, the method, comprising:
adjusting an injection pattern for a plurality of direct injectors of a first cylinder bank to include fuel injections from each direct injector in the first cylinder bank to be preceded by another fuel injection from another direct injector of the plurality of direct injectors in the first bank at least once, the adjusting further including skipping injections for a plurality of direct injectors of a second cylinder bank different than the first cylinder bank, and wherein the second cylinder bank is fueled by only a plurality of port-fuel injectors.

17. The method of claim 16, further comprising adjusting fueling of the plurality of direct injectors of the first cylinder bank based on a learned decrease in fuel rail pressure.

18. The method of claim 16, further comprising adjusting the injection pattern to include fuel injections from each direct injector in the second cylinder bank to be preceded by another fuel injection from another direct injector of the plurality of direct injectors of the second bank at least once, the adjusting further including skipping injections for the plurality of direct injectors of the first cylinder bank, and wherein the first cylinder bank is fueled by only a plurality of port-fuel injectors.

19. The method of claim 18, further comprising ignoring a fuel injection from a direct injector of the second cylinder bank with a preceding injection by a fuel injector of the first bank.

20. The method of claim 16, wherein the adjusting occurs during a fuel injector diagnostic, and wherein cylinders of each of the first cylinder bank and second cylinder bank are fueled during the fuel injector diagnostic.

* * * * *